United States Patent

Mendez et al.

[11] Patent Number: 5,438,705
[45] Date of Patent: Aug. 8, 1995

[54] HONEY BEE PROTECTIVE BAG

[76] Inventors: Arturo Mendez; Esmerardo Ouintanilla; John Norris; Juan Garza, all of 851 N. Almond, Alice, Tex. 78332

[21] Appl. No.: 237,869
[22] Filed: May 4, 1994
[51] Int. Cl.⁶ .............................................. A42B 3/00
[52] U.S. Cl. .............................................. 2/4; 2/202
[58] Field of Search ................... 2/4, 7, 8, 202, 171, 2/174, 200.1, 200.2

[56] References Cited

U.S. PATENT DOCUMENTS

| | | | |
|---|---|---|---|
| 499,965 | 6/1893 | Bushnell | 2/4 |
| 1,398,165 | 11/1921 | Whiteside | 2/202 |
| 2,784,409 | 3/1957 | Slipakoff | 2/4 |
| 4,554,683 | 11/1985 | Wong | 2/202 |

*Primary Examiner*—Jeanette E. Chapman
*Assistant Examiner*—Diana L. Biefeld

[57] ABSTRACT

Disclosed is an Africanize honey bee protective bag for temporary emergency protection of a person against stinging attack by a swarm of bees. A lightweight, compact, single-use, flexible plastic upper body protective garment is carried by a user when travelling in bee infested areas. The Africanize honey bee protective bag comprises a generally rectangular transparent plastic bag for enclosing the upper body of the user. The plastic bag comprises a plastic sheet folded to form a closed top and sealed along each edge to define an open bottom having a circumference adapted to fit over the shoulders of the user. A circular opening is formed through one side of the bag proximal the closed top thereof wherethrough breathing air for the user may flow. A discoid mesh screen is attached to the bag such to cover the circular opening for preventing bees from entering the bag while simultaneously allowing breathing air to pass freely through. A hem having an elastic band inside is provided along the circumference of the bottom. The elastic band has a circumference substantially smaller than the circumference of the open bottom whereby the open bottom is drawn together for tightly encircling the waist of the user to further prevent entry of bees.

2 Claims, 3 Drawing Sheets

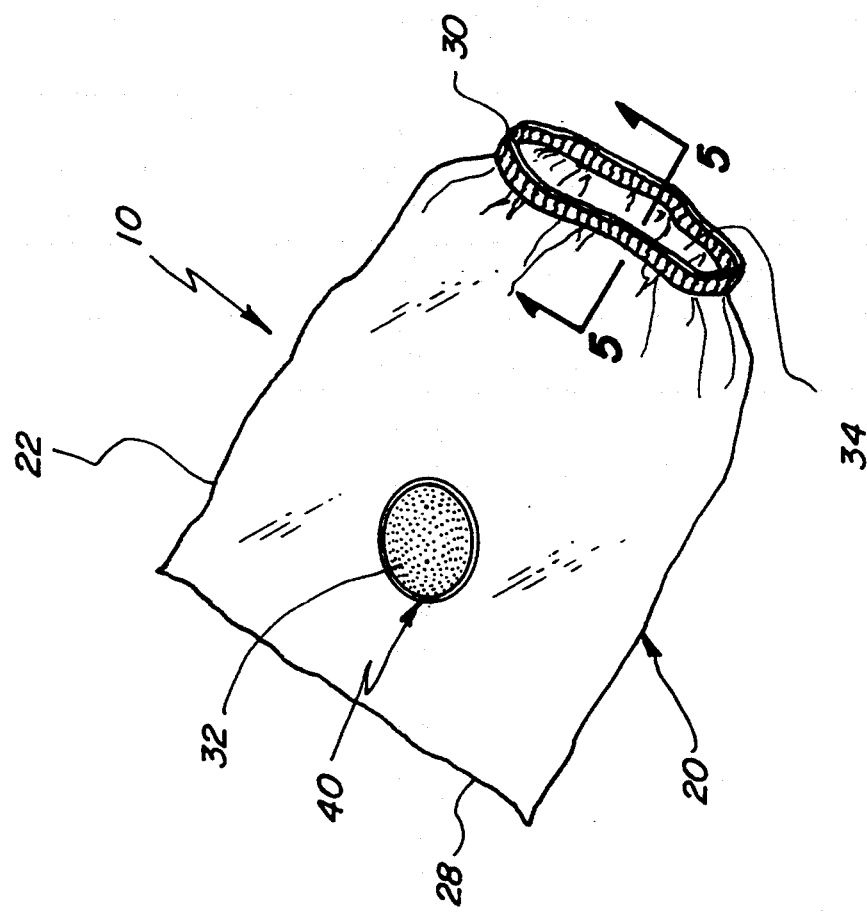
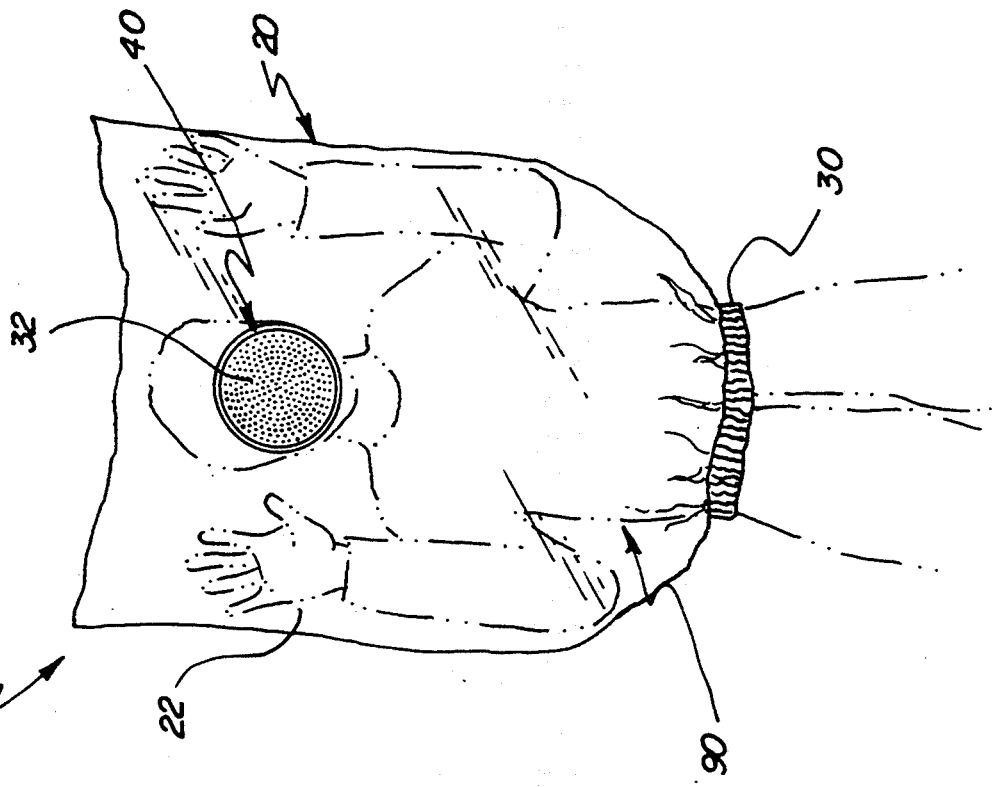

HONEY BEE PROTECTIVE BAG

BACKGROUND OF THE INVENTION

1. Field of the Invention

The present invention relates to plastic bags and more particularly pertains to a protective bag which may be adapted for temporary emergency protection of a person against stinging attack by a swarm of bees.

2. Description of the Prior Art

The use of plastic bags is known in the prior art. More specifically, plastic bags heretofore devised and utilized for the purpose of providing a barrier between the bag contents and environmental factors external the bag are known to consist basically of familiar, expected and obvious structural configurations, notwithstanding the myriad of designs encompassed by the crowded prior art which have been developed for the fulfillment of countless objectives and requirements.

The present invention is directed to providing a device for temporary emergency protection of a person against stinging attack by a swarm of bees by using a lightweight, compact, single-use, flexible plastic bag in a manner which is safe, secure, economical and aesthetically pleasing.

The prior art discloses a number of plastic bags with elastic or draw strap closures. Patents for devices of this type include U.S. Pat. Nos. 4,930,905 to Sharps, Jr., 5,040,902 to Eaton et al., 4,509,570 to Eby et al., 5,133,607 to Bonke, and 4,747,701 to Perkins.

While these devices fulfill their respective, particular objectives and requirements, the aforementioned patents do not disclose a protective bag for temporary emergency protection of a person against stinging attack by a swarm of bees. Furthermore, none of the prior art plastic bags teach or suggest a way to provide a breathing passage through the bag so to enable a user to pull the bag over his upper body as a barrier against stinging insects.

In this respect, the Africanize honey bee protective bag according to the present invention substantially departs from the conventional concepts and designs of the prior art, and in so doing provides an apparatus primarily developed for the purpose of temporary emergency protection of a person against stinging attack by a swarm of bees.

Therefore, it can be appreciated that there exists a continuing need for an Africanize honey bee protective bag which can be used for temporary emergency protection of a person against stinging attack by a swarm of bees by using a lightweight, compact, single-use, flexible plastic upper body protective garment carried by the user when travelling in bee infested areas. In this regard, the present invention substantially fulfills this need.

As illustrated by the background art, efforts are continuously being made in an attempt to develop devices for providing a barrier between the bag contents and environmental factors external the bag. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of plastic bags now present in the prior art, the present invention provides a new plastic bag construction wherein the same can be utilized for temporary emergency protection of a person against stinging attack by a swarm of bees. As such, the general purpose of the present invention, which will be described subsequently in greater detail, is to provide an Africanize honey bee protective bag apparatus and method which has all the advantages of the prior art plastic bags and none of the disadvantages.

The invention is defined by the appended claims with the specific embodiment shown in the attached drawings. For the purpose of summarizing the invention, the invention may be incorporated into an Africanize honey bee protective bag for temporary emergency protection of a person against stinging attack by a swarm of bees by using a lightweight, compact, single-use, flexible plastic upper body protective garment carried by a user when travelling in bee infested areas. The Africanize honey bee protective bag comprises a generally rectangular plastic bag for enclosing the upper body of the user. The plastic bag comprises a transparent plastic sheet folded to form a closed top and sealed along each edge to define an open bottom having a circumference adapted to fit over the shoulders of the user. The bag has a length and width suitable for containing the upper body of the user therein. A circular opening is formed through one side of the bag proximal the closed top thereof wherethrough breathing air for the user may flow. A hem is provided along the circumference of the bottom. An elastic band is provided in the hem, the elastic band having a circumference substantially smaller than the circumference of the open bottom whereby the open bottom is drawn together for tightly encircling the waist of the user. A discoid mesh screen is attached to the bag such to cover the circular opening for preventing bees from entering the bag while simultaneously allowing breathing air to pass freely therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an Africanize honey bee protective bag for temporary emergency protection of a person against stinging attack by a swarm of bees.

It is another object of the present invention to provide an Africanize honey bee protective bag which may be easily and efficiently manufactured and marketed.

It is a further object of the present invention to provide an Africanize honey bee protective bag which is of a durable and reliable construction.

An even further object of the present invention is to provide an Africanize honey bee protective bag which is susceptible of a low cost of manufacture with regard to both materials and labor, and which accordingly is then susceptible of low prices of sale to the consuming public, thereby making such Africanize honey bee protective bags economically available to the buying public.

Still yet another object of the present invention is to provide an Africanize honey bee protective bag which provides in the apparatuses and methods of the prior art some of the advantages thereof, while simultaneously overcoming some of the disadvantages normally associated therewith.

Still yet another object of the present invention is to provide an Africanize honey bee protective bag that is lightweight, compact, and easy to use.

Yet another object of the present invention is to provide an Africanize honey bee protective bag that is a single-use device to address personal hygiene considerations and the possibility of imbedded bee stingers after use.

Even still another object of the present invention is to provide an Africanize honey bee protective bag that is inherently fail-safe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the Africanize honey bee protective bag showing its manner of use.

FIG. 2 is a perspective view of the invention of the present invention.

DESCRIPTION OF THE PREFERRED EMBODIMENT

Figure 4:
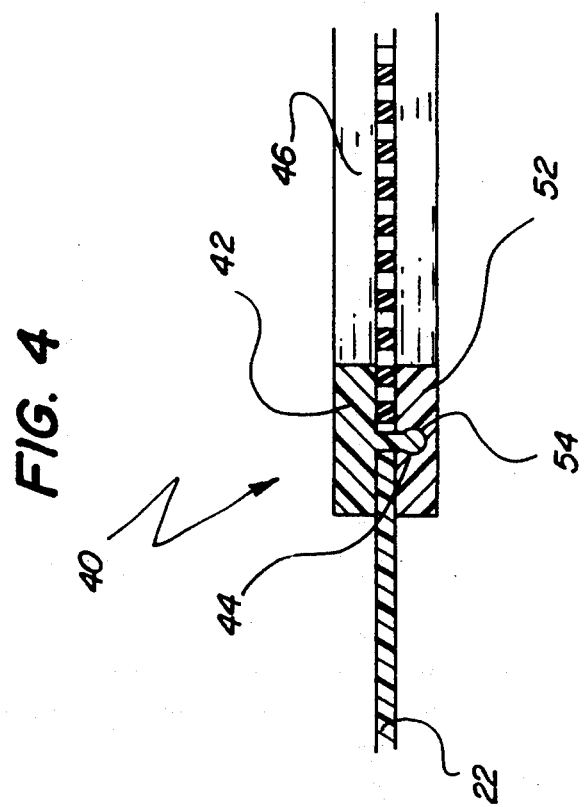
FIG. 4 is a sectional view of the invention of FIG. 3 taken along the line 4—4 and showing its manner of construction.
Figure 3:
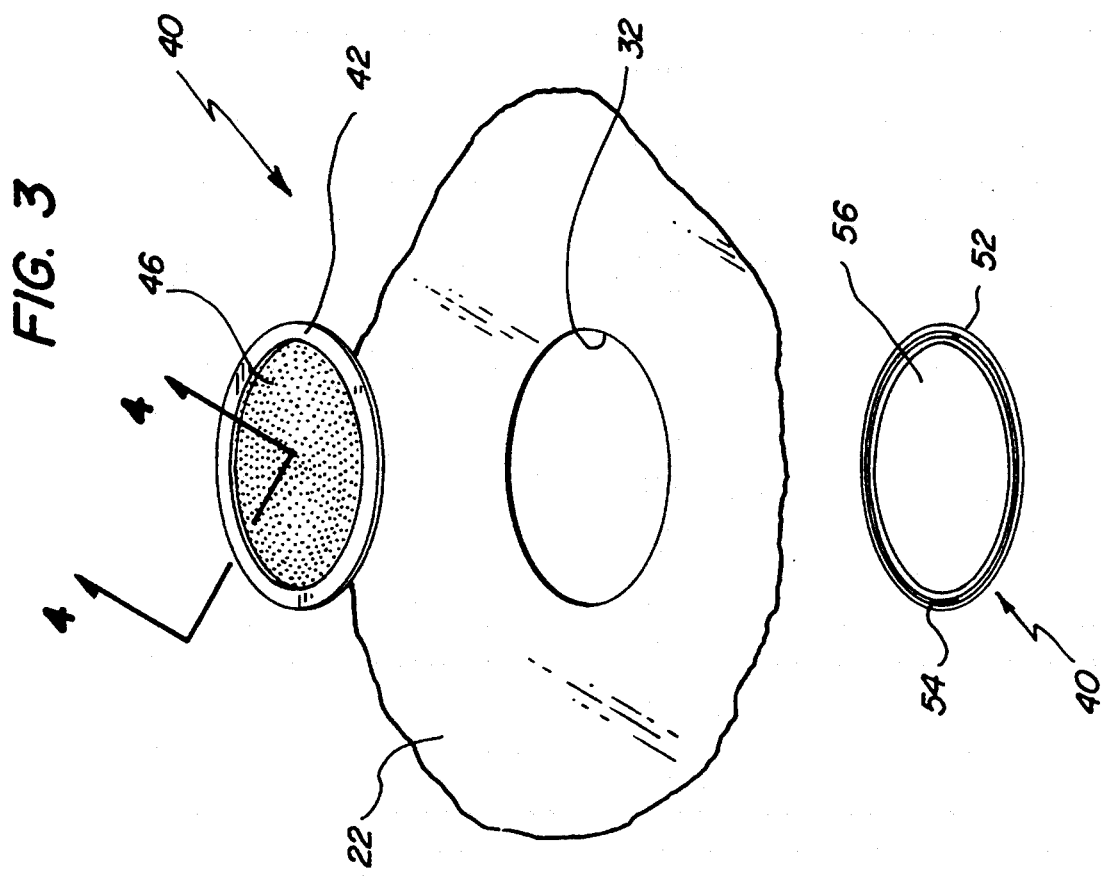
FIG. 3 is a perspective detail exploded view of the breathing screen of the preferred embodiment of the invention showing its manner of assembly.

With reference now to the drawings, and in particular to FIG. 1 thereof, an Africanize honey bee protective bag embodying the principles and concepts of the present invention and generally designated by the reference numeral 10 will be described.

From an overview standpoint, the Africanize honey bee protective bag is adapted for use for temporary emergency protection of a person against stinging attack by a swarm of bees by using a lightweight, compact, single-use, flexible plastic upper body protective garment carried by the user when travelling in bee infested areas. See FIG. 1.

With reference now to FIGS. 1-6 and more specifically, it will be noted that a Africanize honey bee protective bag 10 is shown. The Africanize honey bee protective bag 10 comprises a generally rectangular plastic bag 20 for enclosing the upper body of the user 90. The plastic bag 20 comprises a transparent plastic sheet 22 folded to form a closed top 28 and sealed along each edge to define an open bottom 34 having a circumference adapted to fit over the shoulders of the user 90.

The bag 20 has a length and width suitable for containing the upper body of the user 90 therein. A circular opening 32 is formed through one side of the bag proximal the closed top 28 thereof wherethrough breathing air for the user 90 may flow. A hem 24 is provided along the circumference of the bottom 34. An elastic band 30 is provided in the hem, the elastic band 30 having a circumference substantially smaller than the circumference of the open bottom 34 whereby the open bottom is drawn together for tightly encircling the waist of the user 90.

A plastic discoid mesh screen assembly 40 is attached to the bag such to cover the circular opening 32 for preventing bees from entering the bag 20 while simultaneously allowing breathing air to pass freely therethrough. The screen assembly 40 comprises an outer disc-shaped screen component 46 having a coplanar integral rim 42 therearound, the rim being slightly larger than the circular opening 32 through the bag 20. The rim 42 has a circumferential tongue 44 projecting rearwardly therefrom, normal the plane of the rim 42. An cooperating inner ring component 52 is the same diameter as the rim 42 and has a circumferential tongue receiving groove 54 formed thereon. The tongue 44 extends through the circular opening 32 such that the screen 46 is centered over the opening 32 with a peripheral region of plastic sheet 36 underlying the rim 42. The tongue is snapidly engaged with the groove 54 whereby trapping the peripheral region of plastic sheet 36 between the rim 42 and the ring 52 such to form a secure seal around the screen assembly 40.

Figure 6:
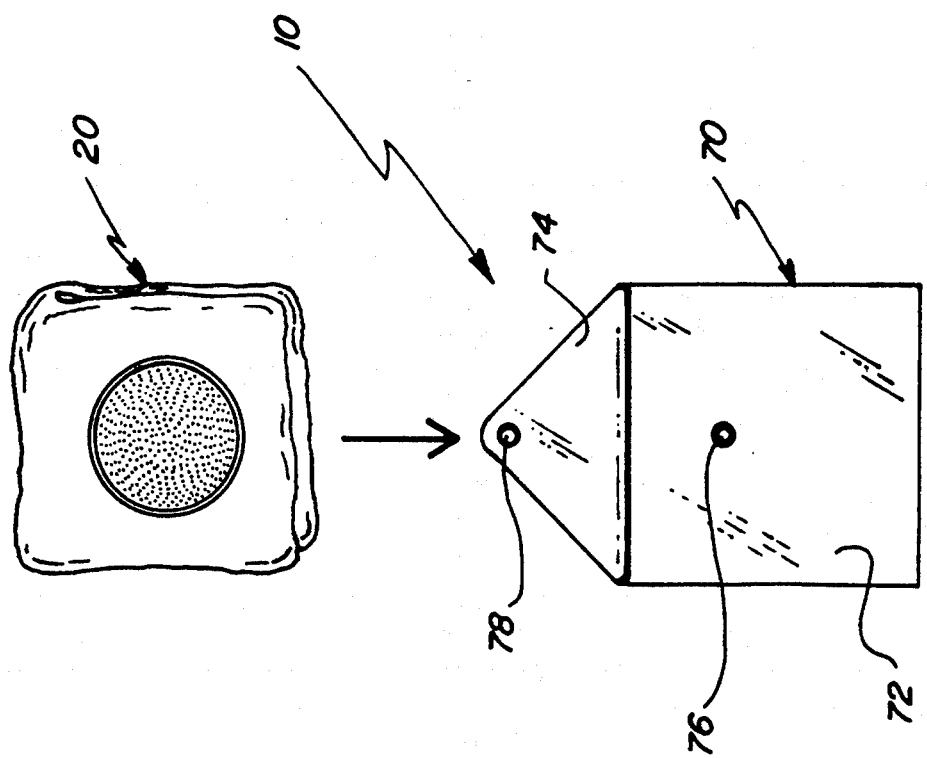
FIG. 6 is a front elevational view of the preferred embodiment of the present invention showing the device folded for insertion into a carrying pouch.
Figure 5:
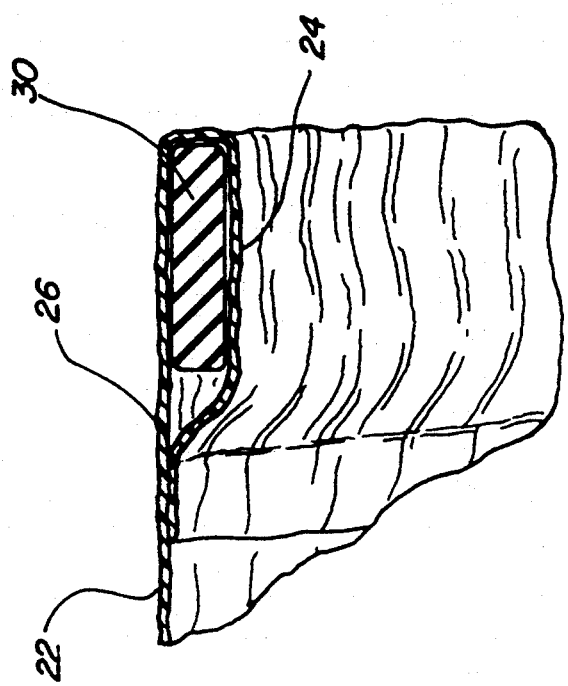
FIG. 5 is a sectional view of the invention of FIG. 2 taken along the line 5—5.

FIG. 6 shows the storage pouch 70, wherein the bee bag 20 may be protectively enclosed, of the preferred embodiment of the present invention 10. The pouch 70 comprises a generally rectangular plastic envelope 72 with an open top 80. A male snap component 76 is attached to the front of the envelope 72. An integral top flap closure 74 has a female snap component 78 attached thereto in cooperative alignment with the male snap component 76 whereby the flap closure 74 may be secured for preventing unwanted egress of the bee bag 20 stored within the pouch 70.

In use, the invention 10 is carried by an individual when travelling in areas where attack by bees is likely. The folded bee bag 20 is stored within the carrying pouch 70 to protect the bag 20 from damage. Upon encountering a swarm of bees, the user 90 removes and unfolds the bee bag 20 from the pouch 70. Holding the bee bag 20 in both hands by the bottom elasticized opening 34, with the breathing screen 40 toward the user, the user pulls the bag 20 over his head so to completely enclose his head, arms, hands, and upper torso. The user 90 adjusts the bag 20 so the breathing screen 40 is aligned directly in front of his face and the elasticized bottom opening 34 tightly encircles his waist without gaps from clothing or the like. The user should then proceed to a safe area away from the swarming bees.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A honey bee protective bag for temporary emergency protection of a person against stinging attack by a swarm of bees by using a lightweight, compact, single-use, flexible plastic upper body protective garment carried by a user when travelling in bee infested areas, the honey bee protective bag comprising:

a generally rectangular plastic bag for enclosing the upper body of the user, the plastic bag comprising a transparent plastic sheet folded to form a closed top and sealed along each edge to define an open bottom having a circumference adapted to fit over the shoulders and arms of the user, the bag having a length and width suitable for containing the upper body of the user therein, a circular opening through one side of the bag proximal the closed top thereof wherethrough breathing air for the user may flow, and a hem provided along the circumference of the bottom, the bag being imperforate except for the open bottom and the circular opening, the bag having a common circumferential dimension from the closed top to adjacent the open bottom;

an elastic band provided in the hem, the elastic band having a circumference substantially smaller than the circumference of the open bottom whereby the open bottom is drawn together for tightly encircling the waist of the user; and a discoid mesh screen attached to the bag such to cover the circular opening for preventing bees from entering the bag while simultaneously allowing breathing air to pass freely therethrough.

2. The honey bee protective bag of claim 1 wherein a draw string is provided in the hem.

* * * * *